July 26, 1932. T. G. COGHLAN 1,868,694
SLAG TAPPING AND DISPOSAL APPARATUS
Filed May 24, 1930
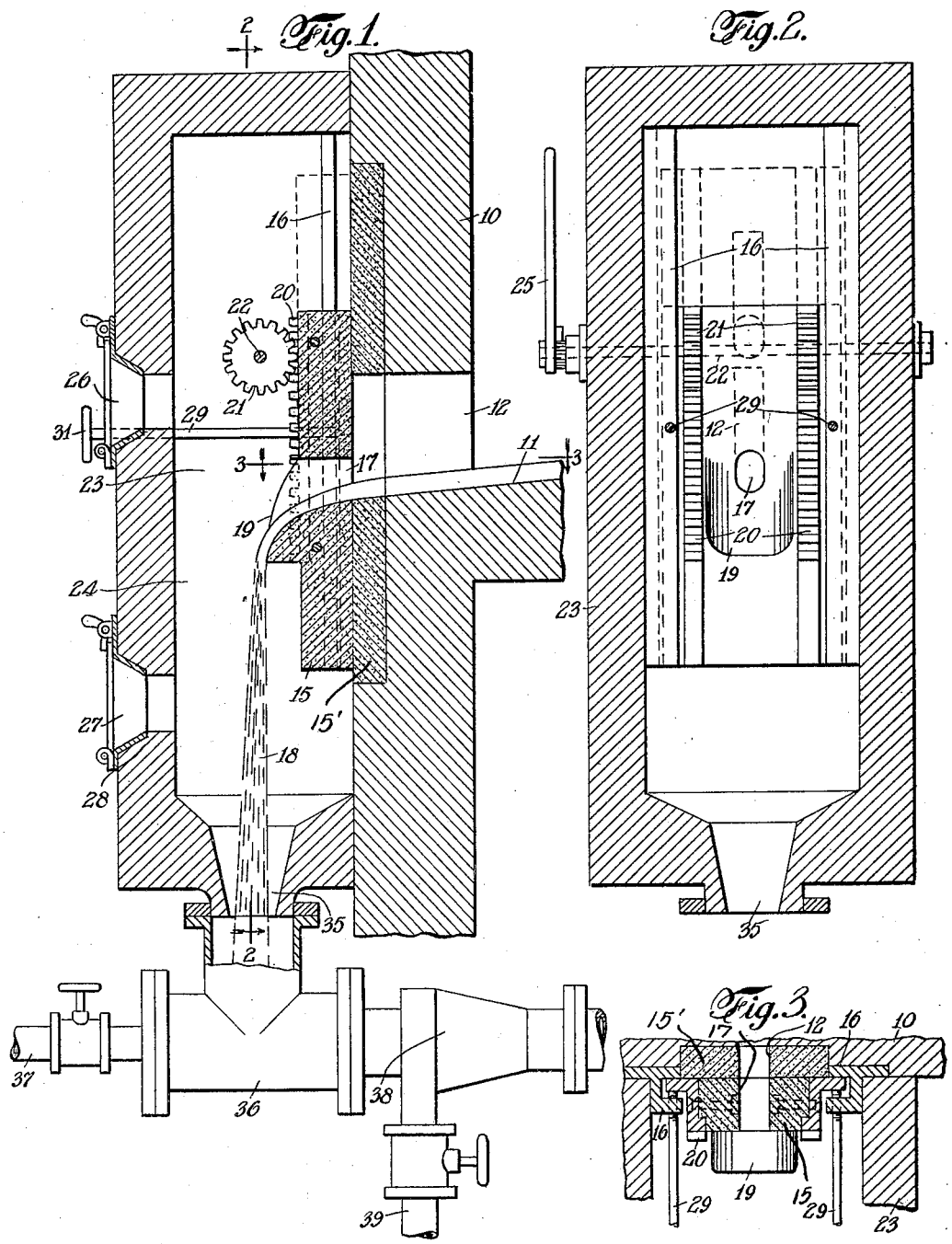
INVENTOR
THOMAS G. COGHLAN
BY
ATTORNEY Patented July 26, 1932

1,868,694

UNITED STATES PATENT OFFICE

THOMAS G. COGHLAN, OF ELIZABETH, NEW JERSEY

SLAG TAPPING AND DISPOSAL APPARATUS

Application filed May 24, 1930. Serial No. 455,179.

The invention relates to apparatus for withdrawing slag from a furnace and for disposing of the same. It has for its object to effect this operation in a simple and expeditious manner by enabling the slag to be drawn off from the top of the accumulated mass, where it is subject to the greatest heat and is most liquid, rather than by the usual arrangement involving the removal of a plug of clay or like material sealing a tap opening provided at the bottom of a furnace, with breaking of hardened slag accretions.

A further object of the invention resides in a novel arrangement for maintaining the slag outlet opening free from accretions of hardened slag.

The invention has for a still further object to provide for the eventual delivery of slag in a powdered or disintegrated condition directly as a result of the novel arrangement for its removal from a furnace.

In carrying out the invention, the usual circular tap opening provided at the furnace bottom for discharge of the slag is altered to have an elongated form; and provision is made for reciprocating over the same a gate member having a suitable discharge opening which is adapted in certain positions of the gate to register with the slag at various levels to drain the same from the maximum upper level to the bottom of the furnace, the gate in other positions being adapted to seal off the said elongated opening. When the two openings are thus in registry, slag will be discharged from the furnace; and it is preferred to deliver the same into a discharge chamber located in front of the furnace outlet opening and which seals the same against the surrounding atmosphere, the said discharge chamber also having an opening in the bottom through which the slag is delivered. The slag, moreover, may be discharged thereto from a suitable spout associated with the gate at its opening.

Furthermore, the bottom opening of said discharge chamber is designed to communicate with a suitable removal device such as a water- or steam-operated ejector, which will not only serve to disintegrate the outflowing slag but will induce a flow of hot gas from the furnace through the various openings to prevent any freezing of slag material thereat.

The nature of the invention, however, will best be understood when described in connection with the accompanying drawing, in which:

Fig. 1 is a side elevation and part vertical section illustrating the novel system of removing slag as applied to a furnace.

Fig. 2 is a fragmentary vertical section taken on the line 2—2, Fig. 1.

Fig. 3 is a horizontal section taken on the line 3—3, Fig. 1.

Referring to the drawing, 10 designates the lower portion and front wall of a furnace. for example, of the powdered fuel burning type, and the bottom of which is represented at 11 and preferably inclined toward an outlet 12 for slag collecting over said bottom so as to readily drain therefrom through the said outlet. The latter, contrary to the usual practice, is in the form of an elongated vertical opening, more particularly shown in Fig. 2 of the drawing.

In accordance with the invention there is also arranged in front of said slag outlet opening 12 a reciprocable gate member 15, as of graphite, carborundum or other refractory material and slidable over a block 15' set in the wall 10. The gate member may be mounted to this end in suitable guides 16 which are vertically disposed along the outer surface of the front wall 10 of the furnace; and said gate member is provided with an opening 17, somewhat elongated through shorter than the outlet opening 12 and designed to register in certain positions therewith or to be entirely closed off from said opening.

For example, as indicated in Figs. 1 and 2 of the drawing, the gate 15 has been lowered from its uppermost position (indicated by the dotted line position) to bring the opening 17 in position before the opening 12 so as to entirely drain the furnace of slag. The latter is indicated as draining therefrom in a stream 18 discharged, preferably, from a spout 19 attached to the front of the said gate below its opening 17. In order to shut off flow of slag through the opening 12 it is necessary merely to raise the gate 15 sufficiently, as to the dotted line position, to cause a lower solid portion thereof to obstruct the said opening 12.

The reciprocation of the gate 15 may be variously accomplished; and there has been shown as one means for effecting this movement a pair of racks 20 longitudinally formed on the gate and adapted for engagement with corresponding pinions 21. These pinions are mounted on a transversely disposed shaft 22 extending outwardly through the side walls 23 of an enclosing casing which affords a discharge chamber 24 sealing off, also, the outlet opening 12 and discharge opening 17 from the surrounding atmosphere for the purpose hereinafter set forth. A double ratchet-lever 25, mounted exteriorly of said chamber, serves as a convenient means to rotate in the desired direction the shaft 22 in a step-by-step movement, and correspondingly position the gate 15. Suitable peep doors 26 and 27 are provided in the front wall 28 of the discharge chamber 24 to enable the operations within said chamber to be viewed.

It is desirable, also, to secure a close fit between the wall 10 and the gate 15 slidable thereon and to insure as well a location of the latter in position and independently of the ratchet. To this end, a pair of screw clamps 29 (Fig. 3) pass through respective threaded guide brackets 16 set in the wall 10, the outer end of a clamp extending through the wall 28 and being provided exteriorly thereof with a hand wheel 31 for manipulating the clamps in holding the gate to the desired location.

As hereinbefore noted, the chamber 24 receives the discharge 18 of slag from the furnace and seals off the openings 12 and 17 from the surrounding atmosphere, the slag being finally delivered through a bottom outlet 35 of the chamber 24 into a sluicing chamber 36 through which water is designed to be directed axially as by means of a pipe or nozzle 37. The liquid slag, due to the action of the water stream thereon, spontaneously disintegrates and is further advanced and removed by means of a suitable ejector device 38 operated through the introduction of an additional supply of water introduced through an inlet pipe 39 and under sufficient head. This ejector device and arrangement may be similar to the device and arrangement more particularly set forth in my co-pending application for U. S. Letters Patent. Serial No. 356,941 filed April 22, 1929; and the disintegrated slag will be discharged from the ejector under a substantial head.

Furthermore, in view of the suction produced by the aforesaid ejector arrangement, an appreciable flow of gaseous medium out of the furnace and at comparatively high temperature is induced, the same passing through the outlet opening 12 and gate opening 17, which is made of sufficient length to permit the gas to flow above the issuing slag. This will serve to keep the slag liquid and prevent it from cooling and hardening thereon, and will thus maintain the parts in serviceable condition.

I claim:

1. In a slag tapping and disposal system: a furnace having a vertical elongated opening extending from the bottom of the chamber to the maximum level of slag accumulating therein, a gate movably mounted in front of said outlet opening and provided with an opening adapted for partial registry therewith, and means to reciprocate said gate before said elongated outlet opening to vary the registry therewith of the gate opening and also to block said elongated opening, said gate opening being adapted to travel substantially to the bottom of the furnace chamber.

2. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, and means to clamp the gate to the furnace.

3. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, and a discharge chamber located in front of the furnace and sealing off its elongated outlet opening from the surrounding atmosphere, said discharge chamber having an outlet at the bottom.

4. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, a discharge chamber located in front of the furnace and sealing off its elongated outlet opening from the surrounding atmosphere, said discharge chamber having an outlet at the bottom, means to clamp the gate to the furnace, and means accessible exteriorly of the discharge chamber for manipulating the clamping means.

5. In a slag tapping and disposal system: a furnace having a vertical elongated outlet opening at the bottom for discharging accumulated slag, a gate movably mounted in front of said outlet opening, provided with an elongated opening of lesser length and adapted for partial registry with said elongated outlet opening, means to reciprocate said gate before said elongated outlet opening to vary the registry therewith of the gate opening and also to block said elongated opening, a discharge chamber located in front of the furnace and sealing off its elongated outlet opening from the surrounding atmosphere, said discharge chamber having an outlet at the bottom, and suction means associated with the discharge chamber to induce a flow of heated gases from the furnace through its outlet opening and during the flow of slag therethrough.

6. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, a discharge chamber located in front of the furnace and sealing off its elongated outlet opening from the surrounding atmosphere, said discharge chamber having an outlet at the bottom, and suction means associated with the discharge chamber to induce a flow of heated gases from the furnace through its outlet opening, the opening in the gate and the bottom opening of the discharge chamber during the flow of slag therethrough.

7. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, a discharge chamber located in front of the furnace and sealing off its elongated outlet opening from the surrounding atmosphere, said discharge chamber having an outlet at the bottom, and an ejector associated with the discharge chamber to induce a flow of heated gases from the furnace through its outlet opening and during the flow of slag therethrough.

8. In a slag tapping and disposal system: a furnace having a vertical elongated outlet opening at the bottom for discharging accumulated slag, a gate movably mounted in front of said outlet opening and provided with an opening adapted for partial registry therewith, means to reciprocate said gate before said elongated outlet opening to vary the registry therewith of the gate opening and also to block said elongated opening, a discharge chamber located in front of the furnace and sealing off its elongated outlet opening from the surrounding atmosphere, said discharge chamber having an outlet at the bottom, and a water-operated ejector with its suction end in communication with the opening at the bottom of the discharge chamber.

In testimony whereof I affix my signature.

THOMAS G. COGHLAN.